United States Patent [19]

Zimmermann

[11] Patent Number: 5,557,153
[45] Date of Patent: Sep. 17, 1996

[54] AIR-COOLED ROTATING ELECTRICAL MACHINE

[75] Inventor: Hans Zimmermann, Mönchaltorf, Switzerland

[73] Assignee: ABB Management AG, Baden, Switzerland

[21] Appl. No.: 306,622

[22] Filed: Sep. 15, 1994

[30] Foreign Application Priority Data

Sep. 15, 1993 [DE] Germany ............... 43 31 243.8

[51] Int. Cl.$^6$ ............... H02K 9/26; H02K 9/00; H02K 9/06
[52] U.S. Cl. ............... 310/56; 310/58; 310/63
[58] Field of Search ............... 310/56, 52, 62, 310/63, 59, 61, 58, 55

[56] References Cited

U.S. PATENT DOCUMENTS

| | | | |
|---|---|---|---|
| 3,566,168 | 2/1971 | Matsubara | 310/105 |
| 3,643,119 | 2/1972 | Lukens | 310/60 |
| 3,840,762 | 10/1974 | Kasabian | 310/50 |
| 4,273,674 | 6/1981 | Ligon, Jr. et al. | 252/408 |
| 4,314,831 | 2/1982 | Barbic | 55/385 R |
| 4,399,378 | 8/1983 | Krumm et al. | 310/56 |
| 4,496,862 | 1/1985 | Weber | 310/56 |
| 4,531,070 | 7/1985 | Kuhn | 310/56 |
| 4,625,133 | 11/1986 | Lobsinger | 310/56 |
| 4,682,064 | 7/1987 | Crounse et al. | 310/61 |
| 5,276,373 | 1/1994 | Zimmerman et al. | 310/58 |
| 5,424,593 | 6/1995 | Vaghani et al. | 310/64 |

FOREIGN PATENT DOCUMENTS

| | | |
|---|---|---|
| 933939 | 7/1949 | Germany. |
| 2318090 | 6/1981 | Germany. |

OTHER PUBLICATIONS

Luftgekuhlte Turbogeneratoren der 200–MVA–Klasse. In: Brown Boveri Technik 3–86, S. 133–138.

*Primary Examiner*—Steven L. Stephan
*Assistant Examiner*—Michael Wallace
*Attorney, Agent, or Firm*—Oblon, Spivak, McClelland, Maier & Neustadt, P.C.

[57] ABSTRACT

In order to cool a rotating electrical machine having an open cooling circuit, mechanically filtered environmental air is normally passed through the cooling ducts in the stator and rotor and the machine air gap (22) by means of fans (15) which are arranged on both ends of the rotor shaft. If the air which is taken from the environment is contaminated with hazardous materials, it is proposed to supply the prefiltered air directly to the stator and the machine air gap and to subject only the cooling air which is to be supplied to the rotor to refiltering in an activated charcoal filter (30). In this case, the mechanically filtered cooling air which is to be supplied to the stator and possibly the machine air gap is passed through the fans, while the refiltered cooling air which is to be supplied to the rotor is passed into the rotor on a separate route. The cooling air for the rotor is in this case preferably conveyed by the rotor's own ventilation. In this way, the investment costs for the subsequent filters are reduced while only a fraction of the required quantity of air still needs to be refiltered.

10 Claims, 2 Drawing Sheets

AIR-COOLED ROTATING ELECTRICAL MACHINE

BACKGROUND OF THE INVENTION

Field of the Invention

The invention relates to a method for cooling an air-cooled rotating electrical machine having an open cooling circuit, in the case of which mechanically filtered environmental air is passed through the cooling ducts in the stator and rotor and the machine air gap by means of fans which are arranged at both ends of the rotor shaft and, after this, is emitted to the environment again.

The invention furthermore relates to a rotating electrical machine which is cooled in accordance with this method.

A gas-cooled electrical machine having these features is disclosed, for example, in "Brown Boveri Technik" [Brown Boveri Technology], 3/86, Pages 133–138, especially FIG. 3 on page 135.

DISCUSSION OF BACKGROUND

The principle of so-called indirect cooling is that the losses which occur in the stator winding bars are to be emitted to the cooling medium (air). In this case, the main heat flow takes place from the bar copper via the insulation into the tooth region of the laminated stator core. The heat is emitted to the cooling medium from the stator teeth.

In the case of machines having an open cooling circuit, mechanically filtered environmental air is passed through cooling ducts in the stator and rotor and the machine air gap by means of fans which are arranged at both ends on the rotor shaft and, after this, are emitted to the environment again. In this case, the mechanical filtering is carried out in conventional dust filters and the like. In the case of extreme environmental conditions, for example a high sulphur dioxide content in the air, either a change is made to a closed cooling circuit or, after it has been "mechanically" filtered, all the cooling air is also passed through a hazardous-material filter, for example an activated charcoal filter. In both cases, the investment costs are increased.

SUMMARY OF THE INVENTION

Accordingly, one object of the invention is to provide a novel method for cooling an air-cooled rotating electrical machine having an open cooling circuit, which method manages with a minimum of investment costs.

This object is achieved according to the invention in that only the cooling air which is to be supplied to the rotor is subjected to refiltering, the mechanically filtered cooling air which is to be supplied to the stator and possibly to the machine air gap being passed through the fans, while the cooling air which is to be supplied to the rotor is passed into the rotor on a separate route. The rotor's own ventilation is preferably used in this case for conveying the cooling air for the rotor.

The invention is in this case based on the knowledge that, because of the easily understandable cooling gas supply in the stator, less damage occurs on or in the cooling ducts than in the more complex cooling air paths in the rotor when using cooling air which is contaminated with hazardous gases. The savings which can be achieved in this way initially relate to the investment costs: the hazardous-material filters become smaller so that only a fraction (approximately 15 to 20%) of the cooling air must be conditioned. Furthermore, the useful lives of the hazardous-material filters are increased.

The rotating electrical machine which is cooled in accordance with the method according to the invention comprises a mechanical filter which is arranged outside the machine housing and from which a first cooling air flow can be supplied directly to the fans on both sides of the machine via first cooling air ducts, and a hazardous-material filter via which a portion of the prefiltered cooling air which leaves the mechanical filter is passed via second cooling air ducts.

Exemplary embodiments of the invention as well as the advantages which can be achieved therewith are explained in the following text with reference to the drawing.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENT

Figure 1:
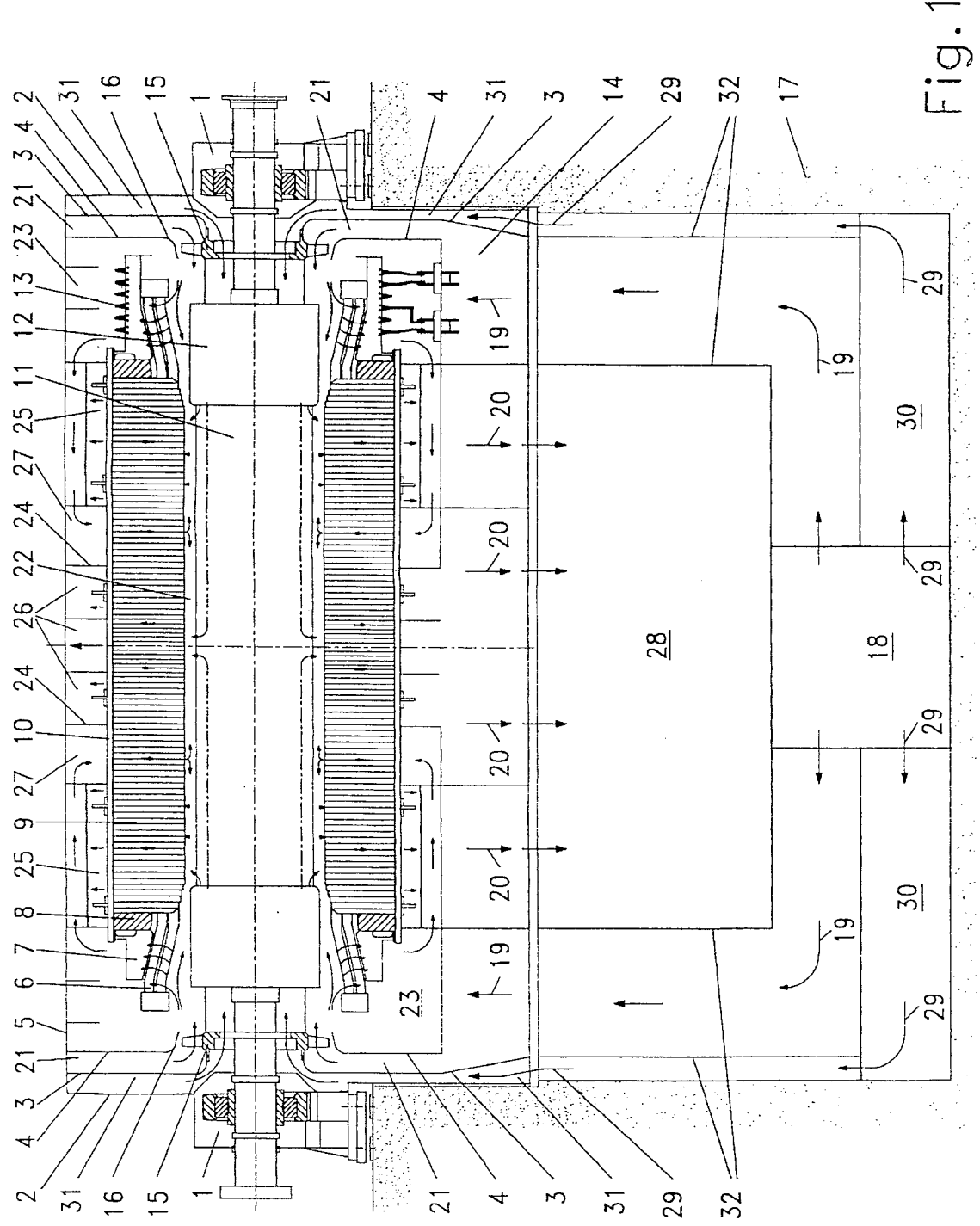
FIG. 1 shows a simplified longitudinal section of an air-cooled generator of a known type, with an open cooling circuit and a separate cooling air supply to the rotor.

Referring now to the drawings, wherein like reference numerals designate identical or corresponding parts throughout the several views, in FIG. 1, 1 designates a pedestal bearing, 2 designates an outer casing, 3 designates a first inner casing, 4 designates a second inner casing and 5 designates a machine housing. The winding overhang 6 is supported on supporting plates 7 on a stator clamping plate 8. Radial ventilation slots 9a are provided in the laminated stator core 9, between the individual laminate element bodies. Tension rods 10 compress the laminated stator core together with stator clamping plates 8. The rotor 11 has rotor caps 12 at both ends. The winding connections in the winding overhang space are designated by 13, and the phase and star-point terminals by 14. An axial fan 15 is provided at each of the two machine ends. The radially inner end of the second inner casing 4 is constructed as an air duct ring 16. A dust filter 18 is provided in a foundation pit 17 underneath the machine. The cold air behind the dust filter 18 is designated by arrows 19 and the hot air from the stator is designated by arrows 20. Other arrows (which are not designated more precisely) indicate the various cooling air flows in the machine interior. Only one machine half can be considered in the following text since the machine is constructed symmetrically, with respect to the cooling.

Cold environmental air flows through the dust filter 18 and the space 21 between the first inner casing 3 and inner casing 4 to the fan 15. The cooling air flow then branches. A first, smaller flow element flows into the machine air gap 22, a second flow element passes through the winding overhang space 23 into the machine rear, to the space between the machine housing 5 and the laminated stator core 9.

Cold and hot gas chambers are formed in the machine rear by means of housing ribs 24 and radial and axial separating walls. In the case of the example, in each case one hot gas chamber 25 at both machine ends and one hot gas chamber 26 in the machine centre, as well as in each case one cold gas chamber 27 between the chambers 25 and 26. The said second cooling air flow flows into the latter from the fan 15, is forced through the ventilation slots 9a between the laminated core element of the laminated stator core 9 and passes into the said hot gas chambers 25 and 26. From the hot gas chambers 25 and 26, the hot cooling gas is passed via large-area perforations on the underneath of the machine housing 5 into an outlet flow space 28 in the foundation pit 17, and from there to the open air.

To this extent, the construction and the cooling air ducting correspond to the machine which is known from "Brown Boveri Technik" [Brown Boveri Technology] cited above.

In contrast to the machine which is known from "Brown Boveri Technik" [Brown Boveri Technology] cited above where the cooling air flow behind the fan 15 additionally branches into a third cooling air flow for cooling the rotor, according to the invention, the separation of the cooling air to the stator and to the rotor has already taken place outside the actual machine housing 5.

As already stated in the introduction, in the case of air-cooled electrical machines, the cooling air which is sucked in from the environment must have dust and other particles as well as water vapor removed from it. As a rule, this is done by means of dust or dirt separators, which are designated mechanical filters in the following text. In the case of the example, this mechanical filter 18 is arranged in the foundation pit 17 underneath the machine. It can also be arranged alongside the machine. In the case of gas turbine groups, where the air which is supplied is likewise mechanically filtered before it is supplied to the compressor, the mechanical filter 18 can then be ommitted.

The mechanically filtered air is passed directly from the filter 18 into the annular space 21 between the first inner casing 3 and the second inner casing 4. An airflow element 29 is passed through in each case one activated charcoal filter 30, where hazardous components such as sulphur dioxide etc. are removed. A different separating device for hazardous substances, which is matched to these hazardous materials, can also be used instead of an activated charcoal filter. The air which has been refiltered in this way is not passed into the space 31 between the outer shell 2 and first inner shell 3 until this has been done. The foundation pit 17 is divided into the different air ducting spaces by separating walls 32.

Figure 2:
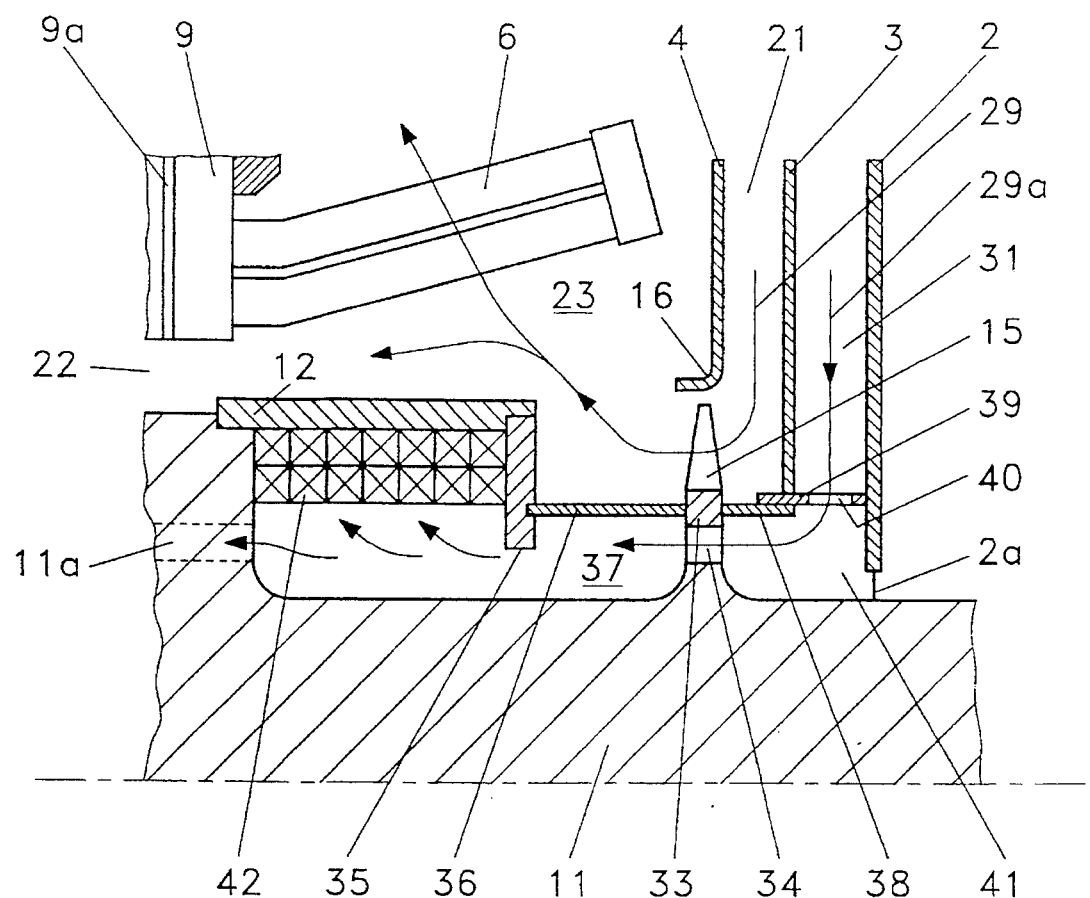
FIG. 2 shows an enlarged detail from FIG. 1, which indicates the special construction of the rotor end part as well as the fresh air paths to the rotor and stator.
Figure 3:
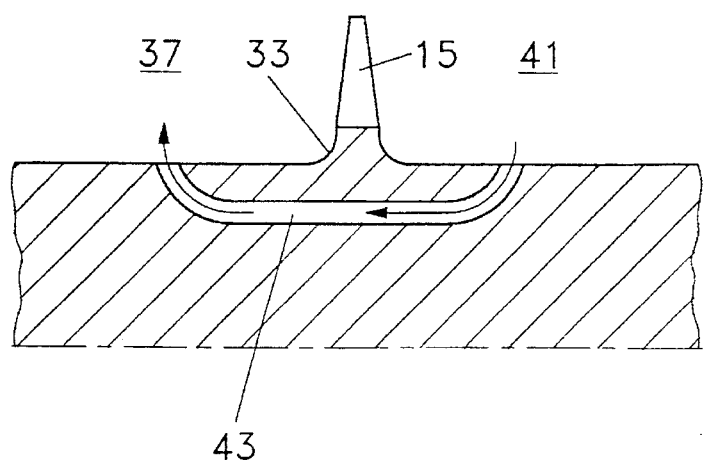
FIG. 3 shows an alternative design of the cooling air supply to the rotor, with ducts in the rotor shaft.

This novel cooling gas ducting requires modifications to the machine itself of course. It is now intended to explain these modifications with reference to FIG. 2, which shows an enlarged longitudinal section, which is modified only in non-essential details, through the end part of the machine according to FIG. 1. In this case identical parts or parts having the same effect are provided with the same reference symbols as in FIG. 1.

The axial fan 15 is mounted on a shaft collar 33. Axially running through-holes 34 are provided in this shaft collar, distributed over its circumference. A first cylindrical cover 36 is provided between the cap plate 35 of the rotor cap 12 and the fan 15. This cylindrical cover 36 separates the winding overhang space 23 from the rotor space 37. A second cylindrical cover 38, which is mounted only on the said shaft collar 33, interacts with a third cylindrical cover 39. The latter is mounted on the first inner casing 2 and on the outer casing 2 and has perforations 40 distributed over its circumference. The mutually facing free ends of the second cover 38 and third cover 39 in this case form a rotating seal between the spaces 21 and 31. For completeness, the shaft seal 2a between the rotor shaft 11 and the outer casing 2 is also indicated.

The cooling airflow coming from the activated charcoal filter 30 passes through the space 31 and the perforations 40 into the space 41 between the rotor shaft and the covers 38 and 39, passes through the holes 34 in the shaft collar and flows into the rotor space 37. There it branches essentially into two flow elements. One flow element passes through the rotor winding overhang 42, and the other flow element flows through the rotor cooling ducts 11a. The two flow elements are combined in the machine air gap 22 and pass from there via the cooling slots 9a in the laminated stator core 9 into the hot gas chambers 25 and 26 (cf. FIG. 1). No special fan is required as the conveying means for the rotor cooling air, since the rotor's own ventilation is used here.

In the case of rotor designs without any particularly pronounced shaft collar 33, the cooling air supply from the space 41 to the rotor space 37 can also be implemented by cooling air passages 43 being incorporated in the rotor shaft, under the shaft collar. However, the production of such passages 43 is costly and, furthermore, weakens the rotor shaft.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A method of cooling an air-cooled rotating electrical machine having an open cooling circuit, comprising the steps of:

mechanically filtering cooling air from environment by a first filter, passing mechanically filtered said cooling air through cooling ducts in a stator and a rotor and a machine air gap by means of fans which are arranged at both ends of a rotor shaft and, subsequently, emitting said air to the environment, wherein the mechanically filtered said cooling air is supplied directly to the stator and to the machine air gap, and wherein a part of the mechanically filtered said cooling air is supplied to the rotor, said part of the mechanically filtered said cooling air being filtered by a second filter, the mechanically filtered cooling air which is to be supplied to the stator and to the machine air gap being passed through the fans, while the cooling air which is to be supplied to the rotor is passed into the rotor on a separate route.

2. The method as claimed in claim 1, wherein the cooling air for the rotor is conveyed by the rotor's own ventilation.

3. An air-cooled rotating electrical machine having an open cooling circuit, having a rotor which is provided with cooling ducts, having a laminated stator core which is provided with cooling ducts, having a machine housing, outer casings on two housing ends, fans on each end of a shaft of the rotor, said fans passing cooling air, which is mechanically filtered by a first filter, through chambers on machine ends into a machine interior, said chambers being separated from the machine interior by second inner casings, wherein said chambers are divided by a first inner casing, a first chamber, which is formed essentially by an outer casing and a first inner casing, being capable of supplying a part of said cooling air directly to the rotor bypassing the fan, said part of said cooling air being filtered by a second filter, wherein a second chamber, which is formed essentially by the first inner casing and the second inner casing, can be supplied only with said cooling air, and wherein means are provided for separating an outlet flow space of the fan from a rotor space.

4. The machine as claimed in claim 3, wherein ducts are provided underneath the fan in order to connect the first chamber to the rotor space.

5. The machine as claimed in claim 4, wherein the fan is mounted on a shaft collar and the ducts are formed by through-holes, which run approximately axially, in the shaft collar.

6. The machine as claimed in claim 4, wherein the ducts are formed by passages in the rotor shaft.

7. The machine as claimed in claim 3, wherein the rotor space is separated from the outlet flow space of the fan by means of a first cylindrical cover, which is preferably mounted on the cap plate of the rotor cap.

8. The machine as claimed in claim 4, wherein the rotor space is separated from the outlet flow space of the fan by means of a first cylindrical cover, which is preferably mounted on the cap plate of the rotor cap.

9. The machine as claimed in claim 5, wherein the rotor space is separated from the outlet flow space of the fan by means of a first cylindrical cover, which is preferably mounted on the cap plate of the rotor cap.

10. The machine as claimed in claim 6, wherein the rotor space is separated from the outlet flow space of the fan by means of a first cylindrical cover, which is preferably mounted on the cap plate of the rotor cap.

* * * * *